US010921337B2

(12) United States Patent
Fujita et al.

(10) Patent No.: US 10,921,337 B2
(45) Date of Patent: Feb. 16, 2021

(54) AUTOMATIC ANALYZING DEVICE

(71) Applicant: Hitachi High-Technologies Corporation, Tokyo (JP)

(72) Inventors: Hiroki Fujita, Tokyo (JP); Toshiharu Suzuki, Tokyo (JP); Takaaki Hagiwara, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 187 days.

(21) Appl. No.: 15/736,053

(22) PCT Filed: May 25, 2016

(86) PCT No.: PCT/JP2016/065375
§ 371 (c)(1),
(2) Date: Dec. 13, 2017

(87) PCT Pub. No.: WO2016/203919
PCT Pub. Date: Dec. 22, 2016

(65) Prior Publication Data
US 2018/0180637 A1 Jun. 28, 2018

(30) Foreign Application Priority Data
Jun. 19, 2015 (JP) .............................. JP2015-123416

(51) Int. Cl.
G01N 35/10 (2006.01)
G01N 35/00 (2006.01)
(Continued)

(52) U.S. Cl.
CPC ........... *G01N 35/1002* (2013.01); *G01N 1/42* (2013.01); *G01N 35/0092* (2013.01);
(Continued)

(58) Field of Classification Search
CPC ............. G01N 35/1002; G01N 35/026; G01N 35/00584; G01N 1/42; G01N 35/04;
(Continued)

(56) References Cited

U.S. PATENT DOCUMENTS 6,090,630 A 7/2000 Koakutsu et al.
2008/0095668 A1* 4/2008 Mototsu ............. G01N 35/1002
422/68.1
(Continued)

FOREIGN PATENT DOCUMENTS

JP 10-142230 A 5/1998
JP 2008-196973 A 8/2008
(Continued)

OTHER PUBLICATIONS

Extended European Search Report received in corresponding European Application No. 16811394.2 dated Mar. 25, 2019.
(Continued)

Primary Examiner — Benjamin R Whatley
Assistant Examiner — Curtis A Thompson
(74) Attorney, Agent, or Firm — Mattingly & Malur, PC

(57) ABSTRACT

The purpose of the present invention is to provide an automatic analyzing device capable of carrying in/out a reagent suitable for the intended use of a user according to the state of the device. An automatic analyzing device has a reagent refrigerator for movably holding reagent containers and a reagent loader for carrying in/out the reagent containers to/from the reagent refrigerator through movement in a direction perpendicular to the reagent refrigerator. A reagent refrigerator cover covers an upper surface of the reagent refrigerator and has an opening through which the reagent loader can pass. A storage unit stores a device state of the automatic analyzing device and a reagent-carry-in/out-method is selected on the basis of the device state. A control
(Continued)

unit controls the reagent holder and the reagent loader according to the selected reagent carry-in/out method so as to carry in/out a target reagent container.

7 Claims, 7 Drawing Sheets

(51) Int. Cl.
*G01N 35/04* (2006.01)
*G01N 1/42* (2006.01)
*G01N 35/02* (2006.01)

(52) U.S. Cl.
CPC ..... *G01N 35/00584* (2013.01); *G01N 35/026* (2013.01); *G01N 35/04* (2013.01); *G01N 2035/0094* (2013.01); *G01N 2035/0443* (2013.01); *G01N 2035/0465* (2013.01)

(58) Field of Classification Search
CPC ....... G01N 35/0092; G01N 2035/0465; G01N 2035/0443; G01N 2035/0094
See application file for complete search history.

(56) References Cited

U.S. PATENT DOCUMENTS

| | | | | |
|---|---|---|---|---|
| 2010/0115463 A1* | 5/2010 | Kondou | ........... | G01N 35/00663 715/803 |
| 2011/0236981 A1* | 9/2011 | Wakamiya | ....... | G01N 35/00732 436/52 |
| 2012/0301359 A1 | 11/2012 | Kraemer et al. | | |
| 2013/0089464 A1* | 4/2013 | Sakashita | ............... | G01N 35/04 422/64 |
| 2013/0244274 A1* | 9/2013 | Nishikawa | ....... | G01N 35/00663 435/39 |
| 2014/0356233 A1* | 12/2014 | Hagiwara | .......... | G01N 35/1016 422/68.1 |
| 2015/0044096 A1* | 2/2015 | Nakasawa | .............. | G01N 35/04 422/64 |
| 2016/0146846 A1 | 5/2016 | Fujita et al. | | |

FOREIGN PATENT DOCUMENTS

| | | |
|---|---|---|
| JP | 2009-068993 A | 4/2009 |
| JP | 2013-500489 A | 1/2013 |
| JP | 2013-217741 A | 10/2013 |
| WO | 2008/007598 A1 | 1/2008 |
| WO | 2013/103119 A | 7/2013 |
| WO | 2015/005356 A1 | 1/2015 |

OTHER PUBLICATIONS

Japanese Office Action received in corresponding Japanese Application No. 2017-524763 dated Jul. 24, 2018.
International Search Report of PCT/JP2016/065375 dated Aug. 30, 2016.

* cited by examiner

AUTOMATIC ANALYZING DEVICE

TECHNICAL FIELD

The present invention relates to an automatic analyzing device that performs qualitative and quantitative analysis of a biological sample, such as blood and urine.

BACKGROUND ART

An automatic analyzing device performs qualitative and quantitative analysis by adding and reacting a reagent that uniquely reacts with the particular component contained in a biological sample, such as blood and urine, to and with the component, and by measuring the light absorbance and the amount of luminescence of a reaction liquid.

The automatic analyzing device, which can analyze a plurality of examination items, is typically provided with a reagent container storage that can store a plurality of reagents corresponding to the examination items in the device. The number of analysis items of the automatic analyzing device has increased recently, and to cope with analysis of a large number of examination items, a growing number of automatic analyzing devices can load a large number of reagent containers by making each reagent container smaller. When the number of reagent containers loaded into the device increases, the possibility that a reagent shortage occurs during the analysis is higher than conventional automatic analyzing devices. Consequently, the device is desired to have a function that can carry in the reagent container even during the analysis.

For example, Patent Literature 1 discloses an automatic analyzing device that is provided with a reagent loader mechanism for carrying a reagent container in the device, and describes that the device has a function of determining whether the reagent preparation processing with respect to the reagent container carried in by the reagent loader mechanism is performed with priority over the analyzing operation.

CITATION LIST

Patent Literature

Patent Literature 1: WO13/103119

SUMMARY OF INVENTION

Technical Problem

When a reagent shortage occurs during the analysis and when due to occurrence of an emergency examination request, it is necessary to analyze a reagent that is an examination item that is not analyzed in routine examination and is not usually disposed in the device, the analysis can be required to be stopped to exchange or additionally carry in the reagent. In these cases, a minimum number of reagents are required to be carried in immediately. In the automatic analyzing device described in Patent Literature 1, the need to temporarily stop the analyzing operation and to wait for completion of the analyzing operation can be eliminated when the reagent container is carried in during the analysis.

On the other hand, in a typical examination room, a device manager previously loads reagents necessary for analysis of the day together into the reagent storage of the device. The loading timing is, for example, the timing (standby) at which the device is not performing the analyzing operation, for example, before start of analysis of the day and after start-up of the device. Since several tens of reagent containers can be disposed in the reagent storage, the device manager is required to drive the reagent loader mechanism many times to set a large number of reagent containers. This can keep the work time of the device manager tied down. Also in the automatic analyzing device described in Patent Literature 1, the time, when the device manager previously loads a large number of reagent containers together, necessary for carrying in/out of the reagents that is required to be operated by the device manager, is not particularly considered.

As described above, the purpose of the user when the reagent is carried in/out during standby and the purpose of the user when the reagent is carried in/out during the analyzing operation are different. Consequently, the reagent carry-in/out method according to either of the intended uses causes unrequired waiting time to the user. This can deteriorate the efficiency of reagent exchange work by the user.

An object of the present invention is to provide an automatic analyzing device capable of carrying in/out a reagent suitable for the intended use of a user according to the state of the device and capable of efficiently performing reagent exchange work without keeping the user waiting in front of the device for a long time.

Solution to Problem

That is, the feature of the present invention in view of the above problems is that an automatic analyzing device is provided with a reagent refrigerator that accommodates therein a reagent holder for cooling and holding a plurality of reagent containers and for movably holding the reagent containers in the reagent refrigerator and a reagent loader for carrying in/out the plurality of reagent containers with respect to the reagent refrigerator by being moved in a direction perpendicular to the reagent refrigerator, a reagent refrigerator cover that covers an upper surface of the reagent refrigerator and has an opening through which the reagent loader can pass, instruction means for instructing movement of the reagent loader, a storage unit that stores a device state of the automatic analyzing device, a reagent-carry-in/out-method selecting unit that selects one of a plurality of reagent carry-in/out methods on the basis of the device state, and a control unit that controls the reagent holder and the reagent loader according to the reagent carry-in/out method determined by the reagent-carry-in/out-method selecting unit. According to determination made by the control unit, the reagent holder and the reagent loader carry in/out a target reagent container.

Advantageous Effects of Invention

According to the present invention, each of carrying in/out of the reagent by the method for carrying in a large number of reagents when the device state is "standby" and carrying in/out of the reagent by the method for immediately carrying in the reagent when the device state is "analyzing" is selected, and the reagent carry-in/out method is selected and performed according to the intended use of the user. Thus, carrying in/out of the reagent that reduces the waiting time can be performed, and the work efficiency of the user can be improved. Problems, configurations, and effects other than the above will be apparent from the description of the following embodiment.

DESCRIPTION OF EMBODIMENTS

Hereinafter, a configuration and operation of an automatic analyzing device 100 according to an embodiment of the present invention will be described with reference to FIGS. 1 to 7. The automatic analyzing device 100 performs different kinds of analyses of, for example, biochemistry, immunity, and the like, in one system. It is noted that the same portions are indicated by similar reference signs.

Figure 1:
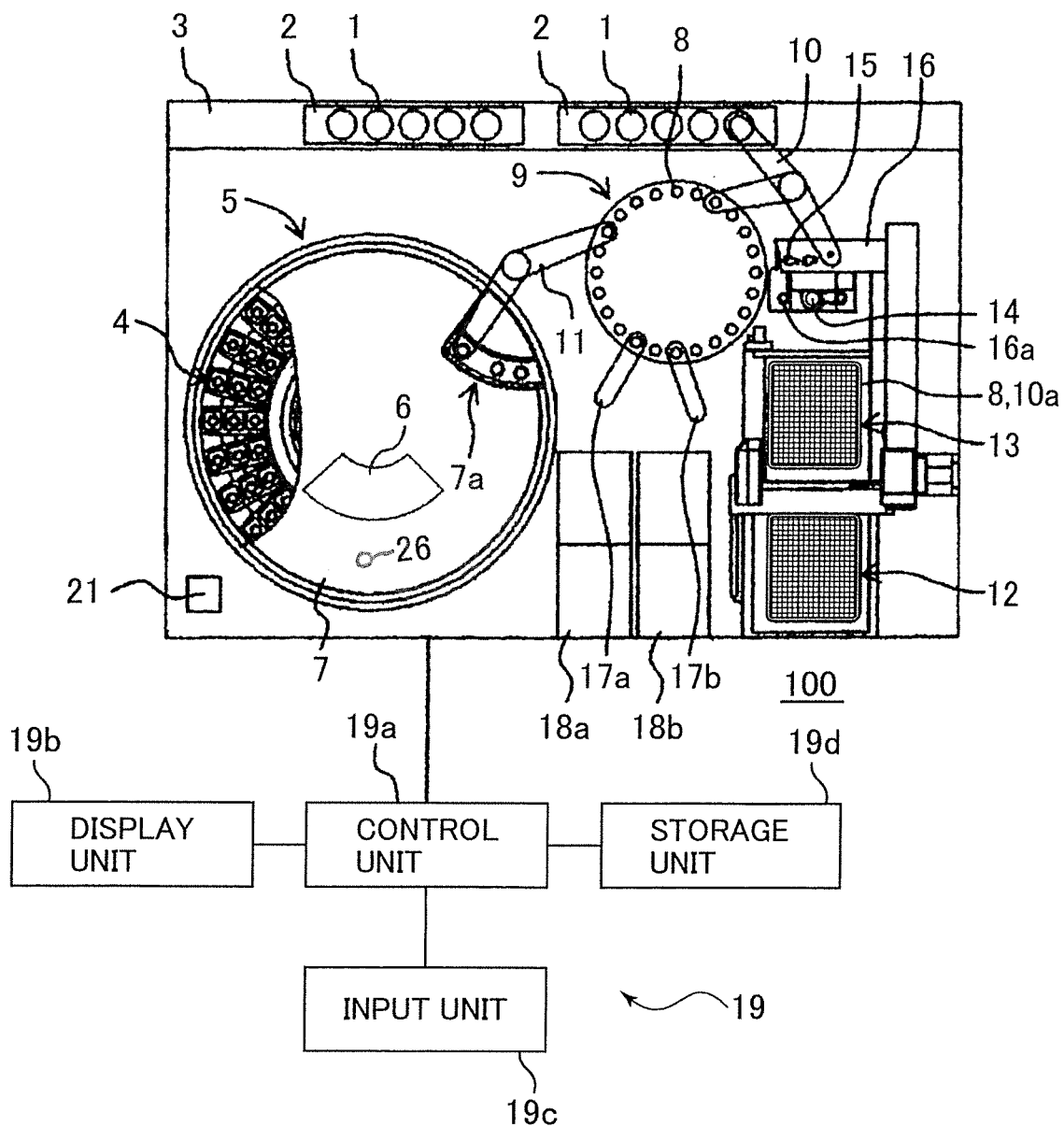
FIG. 1 is a block diagram of an automatic analyzing device according to an embodiment of the present invention.

First, the entire configuration of the automatic analyzing device 100 according to the embodiment of the present invention will be described with reference to FIG. 1. FIG. 1 is a block diagram of the automatic analyzing device 100 according to the embodiment of the present invention. The automatic analyzing device 100 has a rack conveying line 3 that conveys a sample container rack 2, a reagent refrigerator 5, a reagent loader 6, a button 26, an incubator disk 9, a sample dispensing mechanism 10, a reagent dispensing mechanism 11, a reaction container and sample dispensing chip accommodating unit 12, an exchanging and supplying reaction container and sample dispensing chip accommodating unit 13, a reaction container stirring mechanism 14, a disposal hole 15, a conveying mechanism 16, nozzles 17a and 17b, detecting units 18a and 18b, and a controller 19. It is noted that where feasible, the automatic analyzing device of the present invention may have another configuration, or may have a configuration that can hold a plurality of reagent containers.

The sample container rack 2 accommodates a plurality of sample containers 1 that each accommodate a biological sample (hereinafter, called a sample) such as blood and urine. The rack conveying line 3 conveys the sample container rack 2.

The reagent refrigerator 5 (reagent container holding unit) is covered by a reagent refrigerator cover 7, and accommodates a plurality of reagent containers 4 that accommodate various reagents used for analyzing the samples in a state where the reagent containers 4 are warmed at a fixed temperature. In this embodiment, the reagent refrigerator 5 has therein an outer periphery holder 51 that has positions 53 holding the reagent containers 4 on its circumference and can be rotatably driven, and an inner periphery holder 52 that has positions fixedly holding the reagent containers 4. In addition, the later-described reagent loader 6 is disposed adjacent to the inner periphery holder 52, and the inner periphery holder 52 is provided with a motor that drives the reagent loader 6 in the up-down direction. Further, the reagent refrigerator 5 is provided with a reagent container unsealing mechanism (not illustrated) that unseals the reagent containers 4 and can open and close lids of the reagent containers 4 within the reagent refrigerator 5, thereby preventing reagent deterioration. It is noted that the reagent refrigerator 5 is not necessarily required to be of the disk type, and may be of the serial type in which the reagent containers 4 are disposed in one or more rows.

The reagent loader 6 is disposed in an inner periphery of the reagent refrigerator 5. In addition, a reagent container moving mechanism 20 is movably disposed near the reagent loader 6, the reagent container moving mechanism 20 moving each reagent container 4 between the reagent refrigerator 5 and the reagent loader 6. When the reagent container 4 to be carried in is carried in, the reagent container moving mechanism 20 conveys the reagent container 4 from the reagent loader 6 to the outer periphery holder 51, and when the reagent container 4 is carried out, the reagent container moving mechanism 20 conveys the reagent container 4 from the outer periphery holder 51 to the reagent loader 6. The detail of configurations of the reagent loader 6 and the reagent container moving mechanism 20 will be described later with reference to FIG. 2.

The incubator disk 9 has a plurality of container holding holes disposed on its the circumference, the holes capable of accommodating a plurality of reaction containers 8 for mixing the samples and the reagents, and is intermittently rotatably driven so as to position each reaction container 8 to a predetermined position according to progress of the analysis. At the position where the incubator disk 9 is stopped, the processing necessary for the steps of dispensing, stirring, and analyzing the sample and the reagent is performed.

The sample dispensing mechanism 10 has an arm that is rotatably driven and that is driven in the up-down direction, and a nozzle that sucks and ejects the sample. A sample dispensing chip 10a is detachably attached to an end of the nozzle. The nozzle is lowered with respect to the sample container 1 that has been conveyed to the sample dispensing position by the rack conveying line 3, to suck a predetermined amount of the sample, and by rotating the arm, ejects the sample into the reaction container 8 positioned at the predetermined position on the incubator disk 9.

The reagent dispensing mechanism 11 has a nozzle that sucks and ejects the reagent. By horizontal driving, vertical driving, and a sucking and ejecting operation, a predetermined amount of the reagent that has been sucked from the reagent container 4 is ejected into the reaction container 8 positioned at the predetermined position on the incubator disk 9, through a reagent refrigerator cover opening 7a disposed in the reagent refrigerator cover 7.

The reaction container stirring mechanism 14 stirs a reaction liquid accommodated within the reaction container 8 that has been taken out from the incubator disk 9.

The exchanging and supplying reaction container and sample dispensing chip accommodating unit 13 accommodates a plurality of unused reaction containers 8 and sample dispensing chips 10a. The reaction container and sample dispensing chip accommodating unit 12 is on standby for exchanging and supplying each reaction container 8 and each sample dispensing chip 10a. The sample dispensing chip 10a is mounted at the end of the nozzle of the sample dispensing mechanism 10, the sample in the sample container is sucked, and the used sample dispensing chip 10a is disposed of from the disposal hole 15. Likewise, the used reaction container 8 after completion of the analysis is disposed of from an exhausting hole.

The conveying mechanism 16 has a gripper that grips the sample dispensing chip 10*a* and the reaction container 8 accommodated within the exchanging and supplying reaction container and sample dispensing chip accommodating unit 13, and a driving unit that conveys the gripper mechanism along the X-axis, the Y-axis, and the Z-axis. In detail, the conveying mechanism 16 is disposed so as to be movable in the X-axis direction, the Y-axis direction, and the Z-axis direction (not illustrated). The conveying mechanism 16 conveys the reaction container 8 accommodated in the exchanging and supplying reaction container and sample dispensing chip accommodating unit 13, to the incubator disk 9, disposes of the used reaction container 8 into the disposal hole 15, and conveys the unused sample dispensing chip 10*a* to a chip mounting position 16*a*.

By rotational driving and up-down driving, the nozzle 17*a* sucks a reaction liquid that has been mixed in the reaction container 8 on the incubator disk 9, and sends the reaction liquid to the detecting unit 18*a*, and by rotational driving and up-down driving, the nozzle 17*b* sucks a reaction liquid that has been mixed in the reaction container 8 on the incubator disk 9, and sends the reaction liquid to the detecting unit 18*b*. The detecting unit 18*a* subjects the reaction liquid that has been sucked and sent by the nozzle 17*a*, to the detection processing for detecting a particular component, and the detecting unit 18*b* subjects the reaction liquid that has been sucked and sent by the nozzle 17*b*, to the detection processing for detecting a particular component.

An operator operates a reagent-loader switch 21 to report start of carrying in/out of the reagent container 4 to the automatic analyzing device 100. The detail of the processing when the reagent-loader switch 21 is depressed will be described later with reference to FIGS. 5, 6, and 7.

The controller 19 controls an operation of the entire automatic analyzing device 100. The controller 19 is provided with a control unit 19*a*, a display unit 19*b*, an input unit 19*c*, and a storage unit 19*d*. The detail of a configuration of the controller 19 will be described later with reference to FIG. 4.

Figure 2:
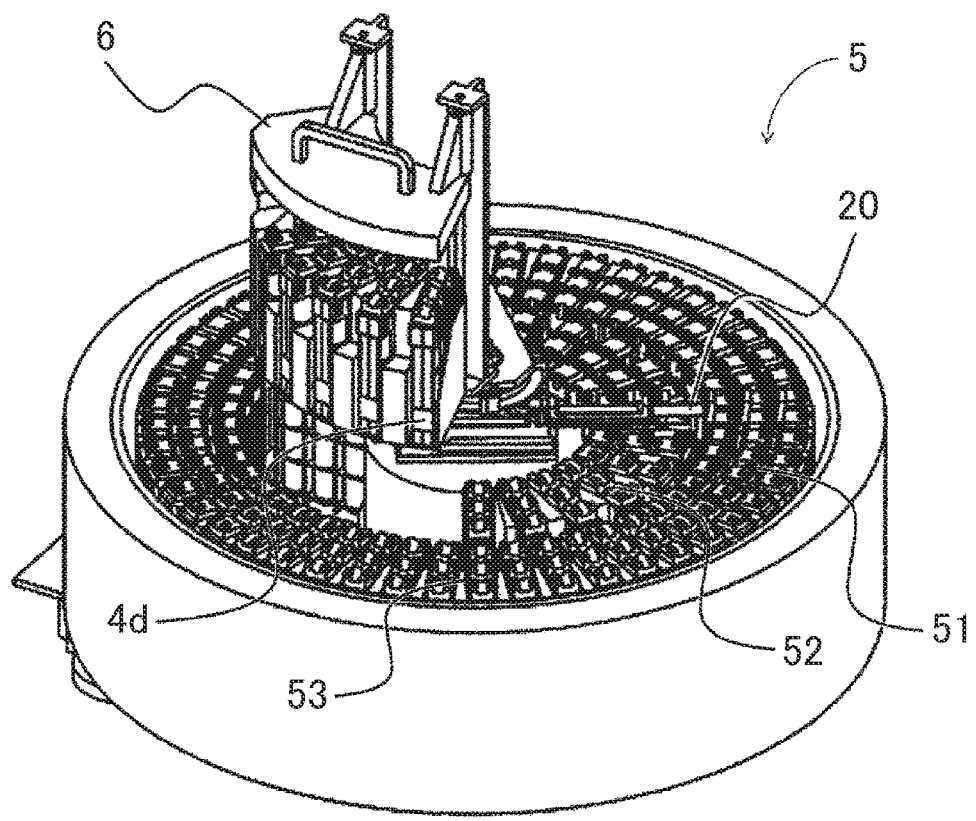
FIG. 2 is a diagram of assistance in explaining a configuration of a periphery of a reagent refrigerator used in the automatic analyzing device according to the embodiment of the present invention.

Next, a configuration of a periphery of the reagent refrigerator 5 (reagent container holding unit) used in the automatic analyzing device 100 according to the embodiment of the present invention will be described with reference to FIG. 2. FIG. 2 is a diagram of assistance in explaining the configuration of the reagent refrigerator 5 used in the automatic analyzing device 100 according to the embodiment of the present invention.

The reagent refrigerator 5 is provided with the outer periphery holder 51 that holds a plurality of reagent containers 4 on its circumference and can be rotatably driven, the inner periphery holder 52 that fixedly holds the reagent containers, and the reagent loader 6 that is disposed on the inner peripheral side of the outer periphery holder 51 (near a center of the reagent refrigerator 5) and can be driven in the up-down direction. The inner periphery holder 52 and the reagent loader 6 are desirably disposed on the same circumference.

The reagent loader 6 is provided with a plurality of positions for inserting the reagent containers 4, and can move the reagent containers 4 inserted at the positions in the up-down direction and transfer them to an inside and outside of the reagent refrigerator 5. It is noted that although the reagent loader 6 in FIG. 2 is provided with five positions and can dispose up to five reagent containers 4, the number of the reagent containers 4 that can be disposed is not limited to five.

Further, a reading device (not illustrated) is disposed near the reagent loader 6, the reading device reading an individual identification label 4*d* (in this embodiment, an RFID tag) attached to a wall surface of the reagent container 4 and sending its identification information to the control unit 19*a* of the controller 19. It is noted that a barcode label may be used as the individual identification label 4*d* of the reagent container 4. The identification information recorded onto the individual identification label 4*d* includes a reagent identification number (identification code) for identifying the reagent accommodated in the reagent container 4, an examination item name to which the accommodated reagent corresponds, a reagent identification code, a lot number, and a sequence number.

The reagent container moving mechanism 20 moves the reagent container 4 in the radius direction of the reagent refrigerator between the outer periphery holder 51, the inner periphery holder, and the reagent loader 6. The reagent container moving mechanism 20 can be rotatably moved about the center of the reagent refrigerator 5, and can access all the positions and all the positions of the outer periphery holder 51, the inner periphery holder 52, and the reagent loader within the reagent refrigerator 5. In this embodiment, the automatic analyzing device 100 is provided with one reagent container moving mechanism 20, but may be provided with a plurality of reagent container moving mechanisms 20. In addition, in this embodiment, the reagent container moving mechanism 20 is independent of the reagent refrigerator 5 and the reagent loader 6, but the reagent container moving mechanism 20 may be included in the reagent refrigerator 5 or the reagent loader 6.

Next, each analyzing operation of the outer periphery holder 51, the reagent loader, and the reagent container moving mechanism 20 of the reagent refrigerator 5 will be described according to the analyzing steps.

First, to dispense a first reagent, the outer periphery holder 51 is rotated to move the target reagent container 4 to the position where the reagent dispensing mechanism 11 can access (reagent dispensation movement 1). The reagent dispensing mechanism 11 accesses the reagent container 4 disposed in the reagent refrigerator 5 to suck the first reagent, and then dispenses the first reagent into the reaction container 8 disposed on the incubator disk 9.

After completion of the sample dispensation and elapse of the reacting time determined for each analysis item, a second reagent is dispensed into the reaction container 8 on the incubator disk 9. When the immunity analysis is performed, the stirring processing for distributing the magnetic particles contained in the second reagent into the liquid is necessary before the dispensation. In the automatic analyzing device 100 of this embodiment, the stirring mechanism for stirring the magnetic particles is disposed on the inner periphery holder 52 side of the reagent refrigerator 5, so that the reagent container 4 is moved between the inner periphery holder 52 and the outer periphery holder 51 by the reagent container moving mechanism 20 before and after stirring of the magnetic particles. At the timing at which the magnetic particles are stirred, the outer periphery holder 51 is rotated, and the reagent container moving mechanism 20 then performs the reagent container moving operation so as to move the target reagent container to the inner periphery holder 52 side, so that the reagent container 4 is moved to the magnetic particles stirring position where the magnetic particles stirring mechanism can access (movement before stirring of the magnetic particles).

The magnetic particles stirring mechanism accesses the reagent container 4 that has been moved to the magnetic particles stirring position, and then stirs the magnetic particles. To move the reagent container 4 in which stirring of the magnetic particles is completed from the inner periphery holder 52 to the outer periphery holder 51, the reagent refrigerator 5 is rotatably driven to move the empty position to the accessing position on the reagent container moving mechanism 20 (movement after stirring of the magnetic particles). To dispense the second reagent after the reagent container has been moved to the outer periphery holder 51, the reagent refrigerator 5 is rotated to move the target reagent container 4 to the position where the reagent dispensing mechanism 11 can access (reagent dispensation movement 2). After the reagent dispensing mechanism 11 has accessed the reagent container 4 disposed in the reagent refrigerator 5 to suck the second reagent, the second reagent is dispensed into the reaction container 8 disposed on the incubator disk 9. As described above, the reagent refrigerator 5 and the reagent container moving mechanism 20 are operated so that a series of reagent dispensing operations in the analysis are performed.

In the automatic analyzing device 100 of this embodiment, only one reagent container moving mechanism 20 is disposed in view of space saving, and both of movement of the reagent container 4 for accessing the magnetic particles stirring mechanism and movement of the reagent container 4 between the reagent container moving mechanism 20 and the reagent loader 6 for carrying in/out the reagent container 4 are performed. Thus, at the timing at which the reagent container moving mechanism 20 moves the reagent container 4 for the analysis, movement of the reagent container 4 to the reagent loader 6 for carrying in/out is not allowed. This is ditto for the outer periphery holder 51. To carry in/out the reagent container without delaying the analyzing operation while the analysis is being performed, the timing at which the analyzing operation is not performed is allocated to carrying in/out of the reagent container by the outer periphery holder 51 and the reagent container moving mechanism.

At the time of carrying in/out the reagent container, the outer periphery holder 51 is rotated to position the position to near the reagent loader 6. Thereafter, the reagent container moving mechanism is operated, and to carry in the reagent, the reagent container is moved from the position on the reagent loader 6 to the empty position on the outer periphery holder 51. To carry out the reagent, the reagent container is moved from the position on the outer periphery holder 51 to the empty position on the reagent loader 6.

Figure 3:
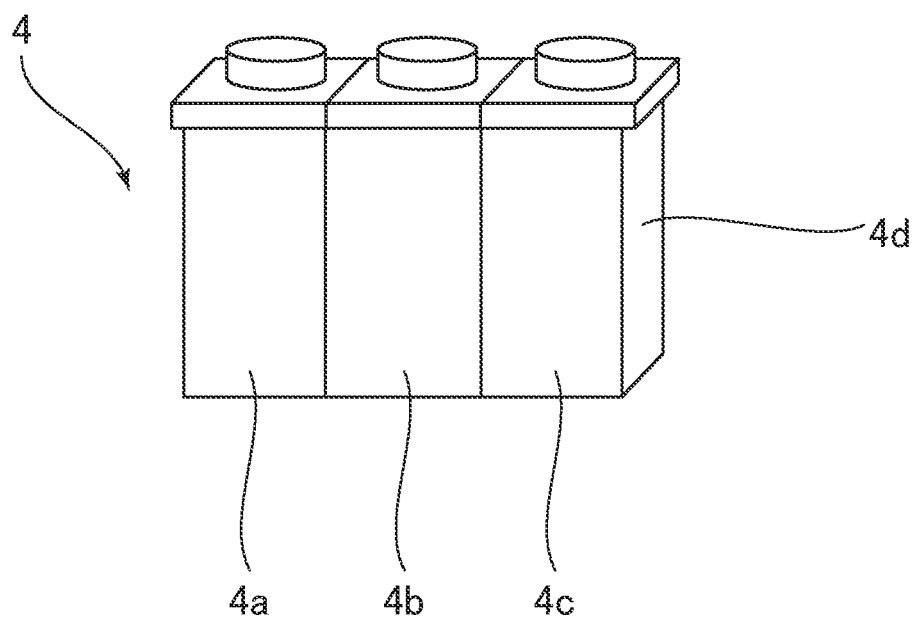
FIG. 3 is a block diagram of a reagent container used in the automatic analyzing device according to the embodiment of the present invention.

FIG. 3 is a block diagram of the reagent container 4 used in the automatic analyzing device 100 according to the embodiment of the present invention. A configuration of the reagent container 4 used in the automatic analyzing device 100 according to the embodiment of the present invention will be described with reference to FIG. 3.

Each reagent container 4 has small containers 4a to 4c that accommodate a plurality (in this embodiment, three) of reagents. One reagent container 4 (that is, the small contains 4a to 4c) accommodates a set of reagents necessary for one analysis item. As the reagent to be accommodated in the containers 4a to 4c of the reagent container 4, there are, for example, a luminescent label reagent including a luminescent label, and a magnetic particles reagent containing magnetic particles.

Figure 4:
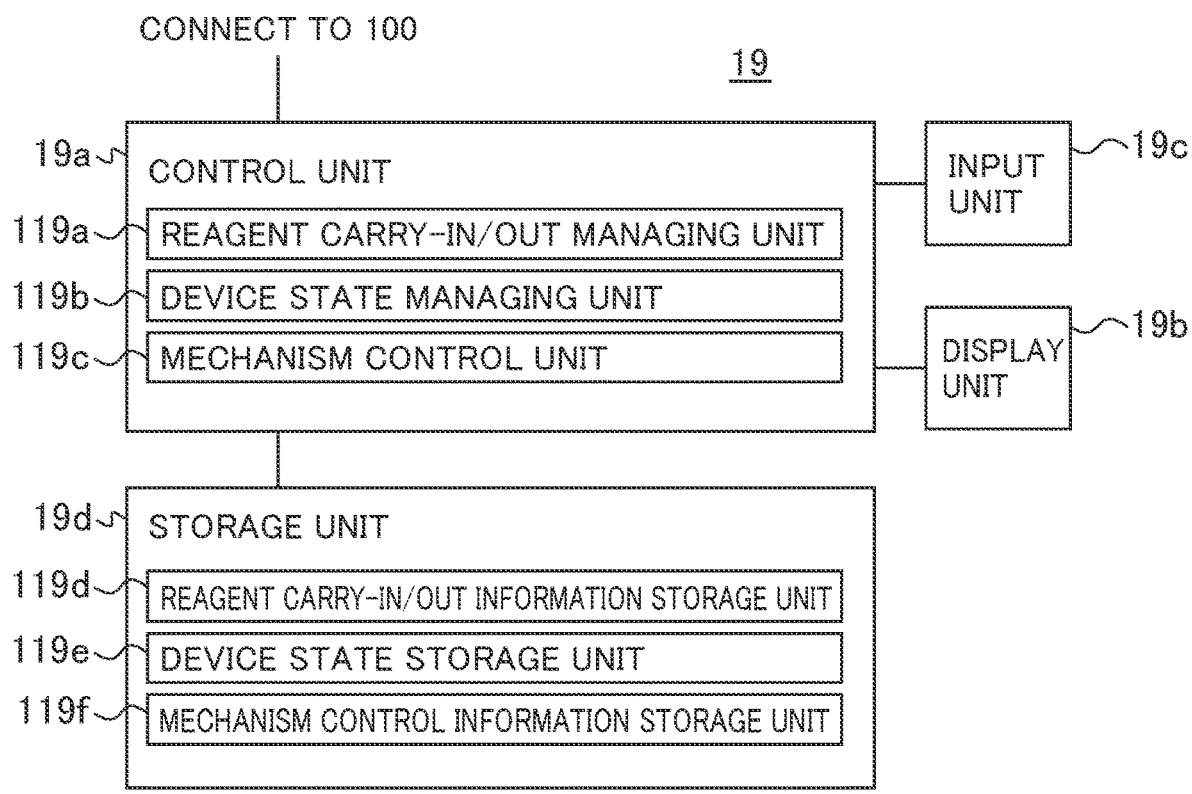
FIG. 4 is a diagram of assistance in explaining functions of a controller used in the automatic analyzing device according to the embodiment of the present invention.

FIG. 4 is a functional block diagram of the controller 19 used in the automatic analyzing device 100 according to the embodiment of the present invention. Functions of the controller 19 used in the automatic analyzing device 100 according to the embodiment of the present invention will be described with reference to FIG. 4. The controller 19 controls an operation of the entire automatic analyzing device 100.

The controller 19 controls carrying in/out of the reagent container 4 and the analysis processing of the sample on the basis of a previously set program or an instruction from the operator inputted by the input unit 19c such as a keyboard, a mouse, and a touch panel. The controller 19 is provided with the control unit 19a that performs the processing of operation control of the automatic analyzing device 100 and an analyzing result, the input unit 19c that inputs information about the sample and the analysis item and setting and that transmits the information to the control unit 19a, as needed, the display unit 19b such as a display and an indicator light that displays an input screen of setting about the analysis, an analyzing result, and the contents of detected abnormality, and the storage unit 19d that stores setting about the analysis, information about the sample and the reagent, and an analyzing result.

The storage unit 19d has a reagent carry-in/out information storage unit 119d, a reagent-being-loaded information storage unit 119e, a reagent position information storage unit 119f, a device state storage unit 119g, and a mechanism control information storage unit 119h.

The reagent carry-in/out information storage unit 119d is a functional block that stores reagent carry-in/out mode information. The reagent carry-in/out information storage unit 119d stores the reagent carry-in/out mode information that has been reported from a later-described reagent carry-in/out managing unit 119a, in each analyzing module that configures the automatic analyzing device 100.

The device state storage unit 119e is a functional block that stores device state information. The device state storage unit 119e stores the device state information that has been reported from a later-described device state managing unit 119b, in each analyzing module that configures the automatic analyzing device 100.

The mechanism control information storage unit 119f is a functional block that stores mechanism control information. The mechanism control information is information about operation control of the mechanism including at least the outer periphery holder 51, the reagent loader 6, and the reagent container moving mechanism 20.

The control unit 19a has the reagent carry-in/out managing unit 119a, the device state managing unit 119b, and a mechanism control unit 119c.

The reagent carry-in/out managing unit 119a is a functional block that manages carrying in/out of the reagent container 4 according to a device state. Specifically, a reagent carry-in/out operation pattern is selected on the basis of the device state information that has been obtained from the device state storage unit 119g. The determined reagent carry-in/out operation pattern is stored, as the reagent carry-in/out mode information, in the reagent carry-in/out information storage unit 119d. The detail of logic of selection of the reagent carry-in/out operation pattern will be described later.

The mechanism control unit 119c is a functional block that controls operation of the outer periphery holder 51, the reagent loader 6, and the reagent container moving mechanism 20. In detail, the mechanism control unit 119c determines rotational driving of the outer periphery holder 51, up-down driving of the reagent loader 6, and an operation of the reagent container moving mechanism 20 on the basis of the reagent carry-in/out mode information that has been obtained from the reagent carry-in/out information storage unit 119d, and creates the mechanism control information. The created mechanism control information is stored in the mechanism control information storage unit 119h. The mechanism control unit 119c takes out the mechanism control information from the mechanism control information storage unit 119h at the timing at which operations of the outer periphery holder 51, the reagent loader 6, and the reagent container moving mechanism 20 are performed, and instructs control of the mechanism on the basis of the mechanism control information.

The device state managing unit 119b is a functional block that provides the device state information to each analyzing module that configures the automatic analyzing device. Information about "standby", "analyzing", or other state is managed as the device state information provided. It is noted that "standby" is referred to as a state where a power source of the device is on and the sample analysis can be started when there is a start instruction from the operator, but the actual sample analyzing operation (such as the sample dispensation, the reagent dispensation, and the detecting operation) has not been started, and "analyzing" is referred to as a state where there is a start instruction from the operator and the sample dispensation has been started.

Figure 5:
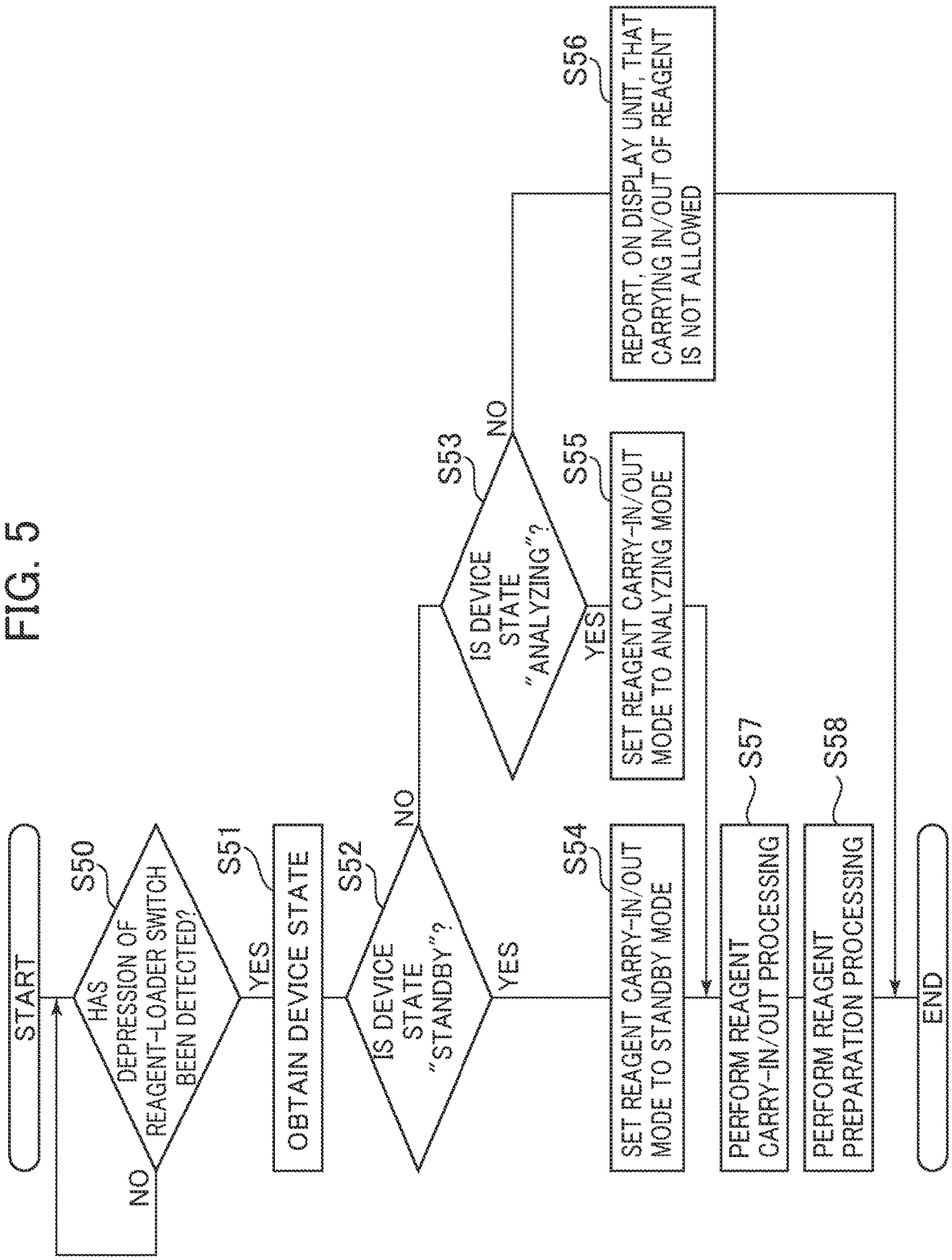
FIG. 5 is a flowchart representing logic that selects reagent carry-in/out modes in the automatic analyzing device according to the embodiment of the present invention.

FIG. 5 is a flowchart representing the embodiment of a processing procedure for selection of reagent carry-in/out modes according to a state of the automatic analyzing device. Selection of the reagent carry-in/out modes of the automatic analyzing device 100 according to the embodiment of the present invention will be described with reference to FIG. 5. In this embodiment, selection of the modes is performed on the basis of "standby", "analyzing", and other device state.

When the reagent carry-in/out managing unit 119a has detected depression of the reagent-loader switch 21 by the operator (step S50; YES), it starts the reagent carry-in/out processing.

When the reagent carry-in/out managing unit 119a has started the reagent carry-in/out processing, it first obtains the device state information from the device state managing unit 119b (step S51).

After the reagent carry-in/out managing unit 119a has obtained the device state information, it determines the reagent carry-in/out operation pattern on the basis of the device state information, and updates the reagent carry-in/out mode information. When the device state information is "standby" (step S52; YES), the reagent carry-in/out managing unit 119a updates the reagent carry-in/out mode information to a "standby mode", and then stores it in the reagent carry-in/out information storage unit 119d (step S54).

When the device state information is not "standby" (step S52; NO) and is "analyzing" (step S53; YES), the reagent carry-in/out managing unit 119a updates the reagent carry-in/out mode information to an "analyzing mode", and then stores it in the reagent carry-in/out information storage unit 119d (step S55).

When the device state information is neither "standby" nor "analyzing" (step S53; NO), the reagent carry-in/out managing unit 119a does not update the reagent carry-in/out mode information, and reports, on the display unit 19b, that carrying in/out of the reagent is not allowed. From this report, the display unit 19b displays, on a screen of an operating terminal, a message to report that carrying in/out of the reagent is not allowed (step S56). At this time, the automatic analyzing device 100 does not perform the reagent carry-in/out processing and the reagent preparation processing.

Figure 6:
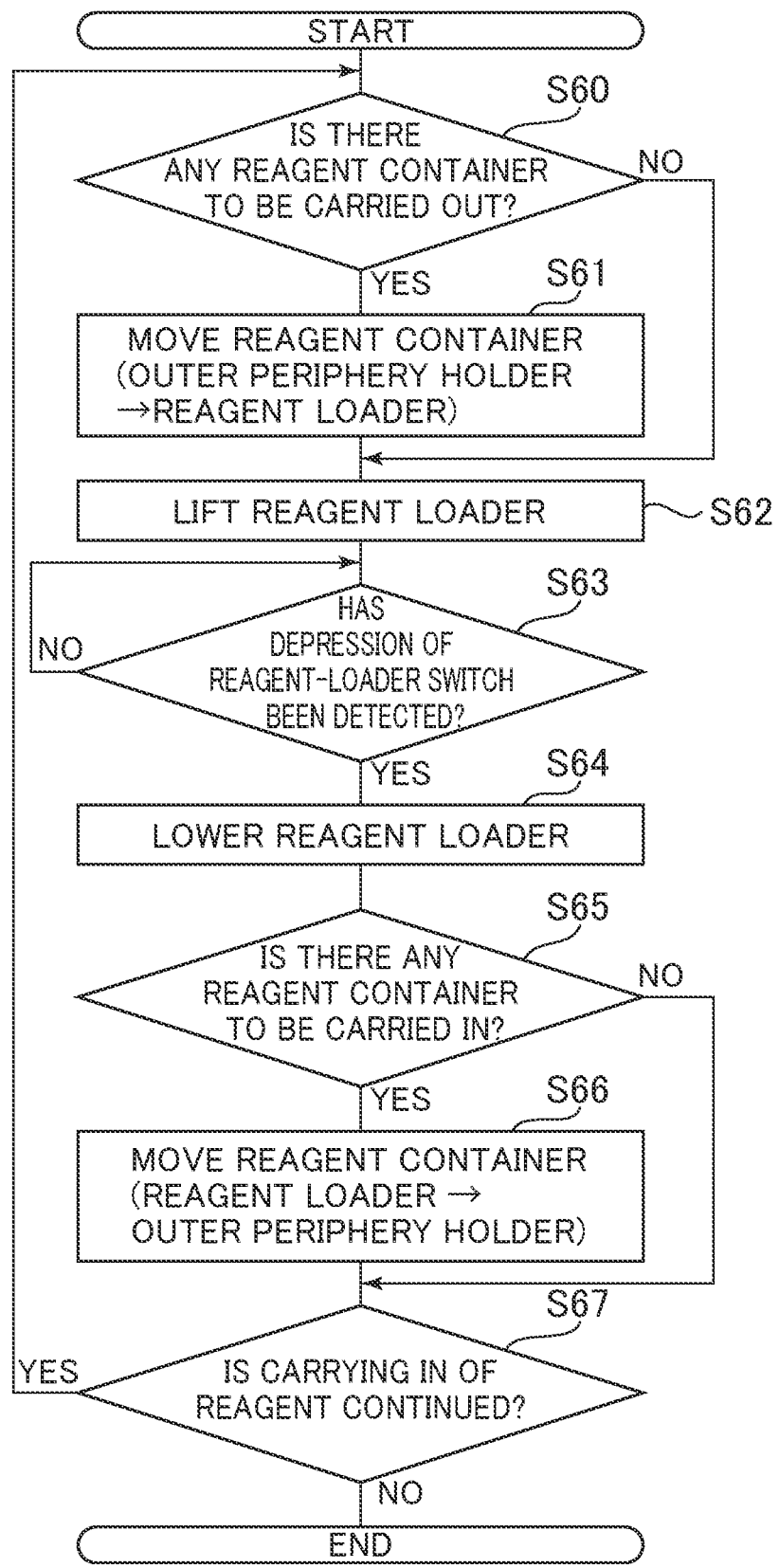
FIG. 6 is a flowchart representing carrying in/out of a reagent in a standby mode in the automatic analyzing device according to the embodiment of the present invention.
Figure 7:
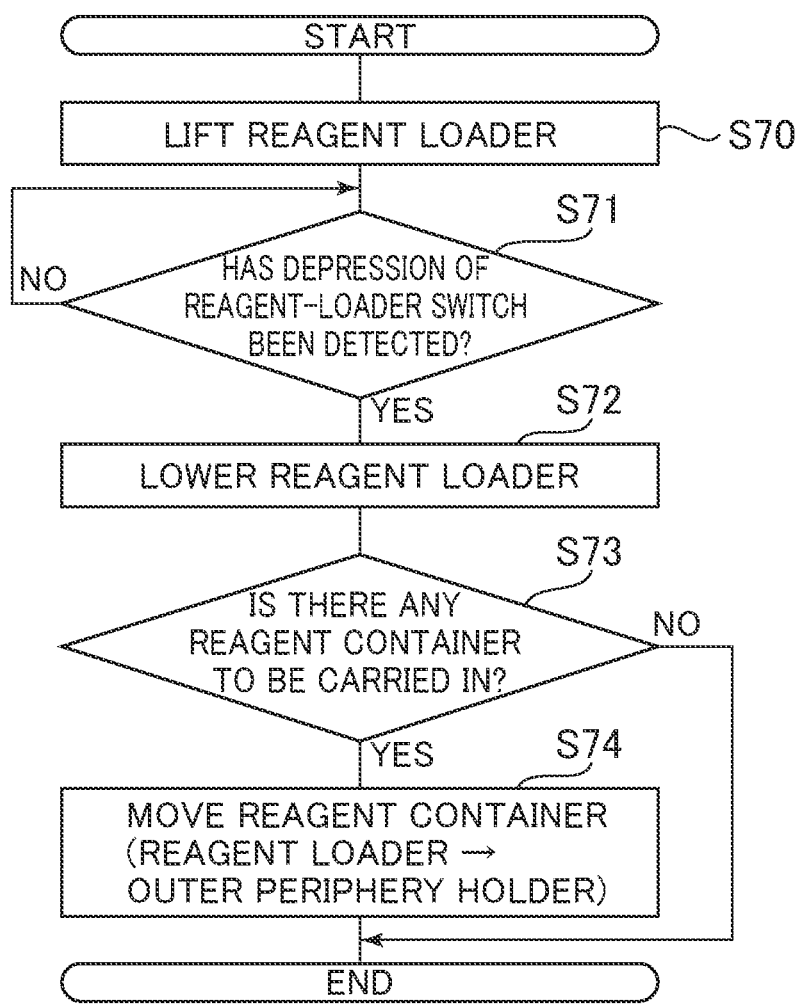
FIG. 7 is a flowchart representing carrying in/out of a reagent in an analyzing mode in the automatic analyzing device according to the embodiment of the present invention.

After the control managing unit 119c has updated the reagent carry-in/out mode information, it obtains the reagent carry-in/out mode information from the reagent carry-in/out information storage unit 119d, and then performs the reagent carry-in/out processing on the basis of that (step S57). Specifically, rotational driving of the outer periphery holder 51, up-down driving of the reagent loader 6, and an operation of the reagent container moving mechanism 20 are determined on the basis of the reagent carry-in/out mode information, and these are stored, as the mechanism control information, in the mechanism control information storage unit 119h. According to the reagent carry-in/out modes, the later-described reagent carry-in/out processing described in FIGS. 6 and 7 is performed. The mechanism control unit 119c takes out the mechanism control information from the mechanism control information storage unit 119h at the timing at which operations of the outer periphery holder 51, the reagent loader 6, and the reagent container moving mechanism 20 are performed, and then instructs control of the mechanism on the basis of the mechanism control information. By switching the reagent carry-in/out processing on the basis of the device state information in this manner, the reagent exchange work according to the intended use of the user can be achieved.

After completion of the reagent carry-in/out processing, to bring the carried-in reagent into a state of being usable for the analysis, the reagent carry-in/out managing unit 119a performs the reagent preparation processing (step S58). This processing, which is automatically performed by the automatic analyzing device 100, does not directly affect the waiting time of the user in front of the device. It is noted that the reagent preparing operation includes, for example, the processing for unsealing the lid that covers the opening of the reagent container, the processing for stirring the reagent containing particles such as magnetic particles, and the processing for performing calibration measurement, but other than these, may include, if any, the processing to be performed before the reagent is used for the analysis.

FIG. 6 is a flowchart representing the embodiment of the reagent carry-in/out processing when the device state is on "standby". The reagent carry-in/out processing when the reagent carry-in/out mode information is the "standby mode" will be described with reference to FIG. 6.

First, when there is any reagent container 4 to be carried out on the outer periphery holder 51 (step S60; YES), the reagent container 4 disposed at the position on the outer periphery holder 51 is moved to the empty position on the reagent loader 6 (step S61). When there is not any reagent container 4 to be carried out on the outer periphery holder 51, step S61 is skipped.

Thereafter, the reagent loader 6 is lifted to the position where the operator can access (step S62). After completion of the lifting operation of the reagent loader 6, the operator can take out the reagent container 4 disposed on the reagent loader 6 to the outside of the device, and can dispose the reagent container 4 to be carried in on the reagent loader 6.

When the device has detected depression of the reagent-loader switch 21 by the operator (step S63; YES), the reagent loader 6 is lowered to the position where it is adjacent to the outer periphery holder 51 in the horizontal direction (step S64). When the device has not detected depression of the reagent-loader switch 21 by the operator (step S63; NO), the device does nothing until the reagent-loader switch 21 is depressed.

During lowering of the reagent loader 6, the presence or absence of the reagent container 4 disposed on the reagent loader 6 is detected by the reading device for the individual identification label 4d of the reagent container 4 disposed near the reagent loader 6. At this time, when there is any reagent container 4 to be carried in (step S65; YES), the reagent container 4 on the reagent loader 6 is moved to the outer periphery holder 51 after completion of the lowering operation of the reagent loader 6 (step S66). When there is not any reagent container 4 to be carried in, step S66 is skipped. It is noted that in this embodiment, to detect the presence or absence of the reagent container 4 disposed on the reagent loader 6, the reading device for the individual identification label 4d of the reagent container 4 is used, but means for physically identifying that the reagent container 4 is disposed, such as a reflective sensor, may be used.

When carrying in of the reagent is continued (step S67; YES), the routine goes to step S60, the reagent loader mechanism is lifted again after the carry-out processing of the reagent container 4 has been performed again, and the operator then exchanges the next reagent container. When carrying in of the reagent is not continued (step S67; NO), the reagent carry-in/out processing is completed, so that the reagent loader remains lowered without being lifted again.

Here, carrying in/out of the reagent is completed without being continued when, during lowering of the reagent loader 6 in step S64, the reading device for the individual identification label 4d of the reagent container 4 disposed near the reagent loader 6 has detected that there is not any reagent container 4 to be carried in disposed on the reagent loader 6, or has detected long depression of the reagent-loader switch 21 for three seconds or more in step S63. It is noted that although in this embodiment, the long depressing time of the reagent-loader switch 21 is three seconds, it is not limited to three seconds. Since whether the reagent loader is lifted again can be identified according to the pressing method of the reagent-loader switch 21, it is possible to prevent complication of an interface of the reagent loader due to disposition of each switch according to the intended use.

After completion of the reagent carry-in/out processing, the carried-in reagent containers are sequentially subjected to the reagent preparing operation, as needed. The processing is automatically performed by the automatic analyzing device. When the reagent container carry-in/out processing is completed, the operator can move away from the device and engage in other work.

As described above, while the device state is on "standby", carrying in/out of the reagent by the reagent loader is performed with priority over the reagent preparation processing that is automatically performed by the automatic analyzing device 100. Thus, even when a large number of reagent containers are carried in/out, the waiting time of the user in front of the device can be reduced. In addition, when it is necessary to carry in/out reagent containers of a larger number than the number of reagent containers that can be carried in/out by the reagent loader at one time, the pressing method of the reagent-loader switch 21 that instructs lowering of the reagent loader is changed, so that the reagent loader can be lifted again without giving a special instruction. This can reduce the labor of the operator.

FIG. 7 is a flowchart representing the embodiment of the reagent carry-in/out processing when the reagent carry-in/out mode information is "analyzing". The reagent carry-in/out processing when the reagent carry-in/out mode information is "analyzing" will be described with reference to FIG. 7.

First, the reagent loader 6 is lifted to the position where the operator can access (step S70). After completion of the lifting operation of the reagent loader 6, the operator can take out the reagent container 4 disposed on the reagent loader 6 to the outside of the device, and can dispose the reagent container 4 to be carried in on the reagent loader 6.

When the device has detected depression of the reagent-loader switch 21 by the operator (step S71; YES), the reagent loader 6 is lowered to the position where it is adjacent to the outer periphery holder 51 in the horizontal direction (step S72). When the device has not detected depression of the reagent-loader switch 21 by the operator (step S71; NO), the device does nothing until the reagent-loader switch 21 is depressed.

During lowering of the reagent loader 6, the presence or absence of the reagent container 4 disposed on the reagent loader 6 is detected by the reading device for the individual identification label 4d of the reagent container 4 disposed near the reagent loader 6. At this time, when there is any reagent container 4 to be carried in (step S73; YES), the reagent container 4 on the reagent loader 6 is moved to the outer periphery holder 51 after completion of the lowering operation of the reagent loader 6, thereby completing the reagent carry-in/out processing (step S74). When there is not any reagent container 4 to be carried in (step S73; NO), the reagent carry-in/out processing is completed at this time.

After completion of the reagent carry-in/out processing, the reagent preparing operation is performed, as needed, with respect to the carried-in reagent container. It is noted that since the device state is "analyzing", when the reagent preparing operation is performed immediately with respect to all the carried-in reagent containers, the need to temporarily stop the analyzing operation is caused, which can lead to delay of measurement result report. Thus, it is necessary to determine which of the reagent preparing operation and the analyzing operation is performed with priority.

One method for determination on the basis of, for example, the depressing method of the reagent-loader switch 21, can be used. For example, when in step S71, long depression of the reagent-loader switch 21 for three seconds or more has been detected, the reagent preparing operation is performed with priority with respect to the reagent container that has been carried in the reagent refrigerator by depressing the switch, and thus, the analyzing operation is controlled so as to be temporarily stopped. On the other hand, in step S71, in the case of short depression in which the depressing time of the reagent-loader switch 21 is less than three seconds, the analyzing operation is prioritized, and the reagent preparing operation with respect to the reagent container that has been carried in the reagent refrigerator by depressing the switch is performed at the timing at which the analyzing operation is completed.

As described above, while the device state is "analyzing", repetition of movement of the reagent container 4 and up-down movement of the reagent loader 6 for carrying out the reagent is eliminated. Thus, when the need to carry in a small number of reagent containers 4 is suddenly caused, the reagent container carry-in work can be completed without keeping the operator waiting.

LIST OF REFERENCE SIGNS

1 . . . Sample container
2 . . . Sample container rack
3 . . . Rack conveying line
4 . . . Reagent container
4a . . . Inside bottle 4b . . . Intermediate bottle
4c . . . Outside bottle
4d . . . Individual identification label
5 . . . Reagent refrigerator
51 . . . Outer periphery holder
52 . . . Inner periphery holder
53 . . . Position
6 . . . Reagent loader
6a . . . Reagent loading position
6b . . . RFID reading position
6c . . . Reagent disposing position
7 . . . Reagent refrigerator cover
7a . . . Reagent refrigerator cover opening
8 . . . Reaction container
9 . . . Incubator disk
10 . . . Sample dispensing mechanism
11 . . . Reagent dispensing mechanism
12 . . . Reaction container and sample dispensing chip accommodating unit
13 . . . Exchanging and supplying reaction container and sample dispensing chip accommodating unit
15 . . . Disposal hole
16 . . . Conveying mechanism
16a . . . Chip mounting position
17a, 17b . . . Nozzle
18a, 18b . . . Detecting unit
19 . . . Controller
19a . . . Control unit
119a . . . Reagent carry-in/out managing unit
119b . . . Device state managing unit
119c . . . Mechanism control unit
19b . . . Display unit
19c . . . Input unit
19d . . . Storage unit
21 . . . Reagent loader switch
119d . . . Reagent carry-in/out information storage unit
119e . . . Device state storage unit
119f . . . Mechanism control information storage unit
100 . . . Automatic analyzing device

The invention claimed is:

1. An automatic analyzing device comprising:
a reagent holder that movably holds a plurality of reagent containers;
a reagent refrigerator that covers a periphery of the reagent holder;
a reagent loader configured to pass through an opening disposed in part of the reagent refrigerator;
a detector configured to detect a predetermined component in a sample to analyze the sample;
a user input device to control movement of the reagent loader; and
a controller programmed to:
control the detector;
upon detecting an instruction from the user input device, determine whether the automatic analyzer is in a standby state in which analysis of the sample has not been started and can be started in response to an analysis instruction for the sample or in an analyzing state in which the analysis of the sample has been started;
upon determining the automatic analyzer is in the standby state, control the reagent holder and the reagent loader so as to execute a carry-in operation according to a first reagent carry-in/out mode,
upon determining the automatic analyzer is in the analyzing state, control the reagent holder and the reagent loader so as to execute the carry-in operation according to a second reagent carry in/out mode which is different than the first reagent carry-in/out mode,
upon determining the automatic analyzer is in the standby state:
upon detecting the user input device being pressed for less than a predetermined time, execute the carry-in operation of a respective reagent container by lowering the reagent loader through the opening and thereafter lift the reagent loader through the opening for receiving a next carry-in operation; and
upon detecting the user input device being pressed for greater than the predetermined time, complete the carry-in operation of the respective reagent container by lowering the reagent loader through the opening without thereafter lifting the reagent loader through the opening for receiving a next carry-in operation, and start to perform a reagent preparing operation on a reagent in the respective reagent container; and
upon determining the automatic analyzer is in the analyzing state:
upon detecting the user input device being pressed for less than the predetermined time, execute the carry-in operation of the respective reagent container by lowering the reagent loader through the opening, perform the analyzing operation with priority and wait until the analysis of the sample is complete, and then perform the reagent preparing operation on the reagent of the respective reagent container, and
upon detecting the user input device being pressed for greater than the predetermined time execute the carry-in operation of the respective reagent container by lowering the reagent loader through the opening, perform the reagent preparing operation with priority with respect to the reagent container that has been carried in, and temporarily stop the analyzing operation until the reagent preparing operation has been completed.

2. The automatic analyzing device according to claim 1, wherein the first reagent carry-in/out mode is a mode enabling continuous reagent carry-in/out of one or more reagent containers by the reagent loader upon detecting the user input device being pressed for less than the predetermined time, and the second reagent carry-in/out mode is a mode disabling continuous reagent carry-in/out of more than one reagent container by the reagent loader.

3. The automatic analyzing device according to claim 2, wherein the controller is programmed to read reagent information of the reagent container carried by the reagent loader,
wherein the controller is programmed to stop the reagent carry-in/out by the reagent loader, when the read reagent information indicates that there is no reagent container to be carried-in by the reagent loader.

4. The automatic analyzing device according to claim 1, further comprising:
a stirring mechanism;
wherein the reagent preparing operation includes at least one of stirring the reagent with the stirring mechanism or performing calibration measurement using the detector.

5. The automatic analyzing device according to claim 1, further comprising:
a stirring mechanism;
wherein the reagent preparing operation includes stirring the reagent with the stirring mechanism and performing calibration measurement using the detector.

6. The automatic analyzing device according to claim 1, further comprising:
- a sample dispensing mechanism including a nozzle;
- a reagent dispensing mechanism including a nozzle;
- wherein the analyzing operation includes at least one of sample dispensation using the sample dispensing mechanism, reagent dispensation using the reagent dispensing mechanism, or sample detection using the detector.

7. The automatic analyzing device according to claim 1, further comprising:
- a sample dispensing mechanism including a nozzle;
- a reagent dispensing mechanism including a nozzle;
- wherein the analyzing operation includes sample dispensation using the sample dispensing mechanism, reagent dispensation using the reagent dispensing mechanism, and sample detection using the detector.

\* \* \* \* \*